United States Patent [19]
Koyanagi et al.

[11] Patent Number: 4,926,544
[45] Date of Patent: May 22, 1990

[54] PRODUCTION SYSTEM USING UNMANNED AUTOMATICALLY GUIDED VEHICLES

[75] Inventors: Haruo Koyanagi, Hachioji; Hideyuki Kumasaka, Yokohama; Koji Takao, Atsugi; Tomohiko Noda, Yokohama, all of Japan

[73] Assignee: Nissan Motor Co., Ltd., Yokohama, Japan

[21] Appl. No.: 236,876

[22] Filed: Aug. 26, 1988

[30] Foreign Application Priority Data

Aug. 27, 1987 [JP] Japan .................. 62-211421
Aug. 27, 1987 [JP] Japan .................. 62-211420

[51] Int. Cl.$^5$ .................................. B23P 21/00
[52] U.S. Cl. ............................ 29/703; 29/712; 29/720; 29/771
[58] Field of Search ................... 29/701–704, 29/711, 712, 714, 720, 771, 791; 180/167; 414/340–348

[56] References Cited

U.S. PATENT DOCUMENTS 3,805,704 4/1974 Schauffler ............... 414/341 X
4,342,536 8/1982 Akeel et al. .
4,543,702 10/1985 Wada .................. 29/711 X

FOREIGN PATENT DOCUMENTS

210572 2/1987 European Pat. Off. ........ 29/771
0213938 3/1987 European Pat. Off. .
238756 8/1986 Fed. Rep. of Germany .
160368 7/1986 Japan .................. 180/167
2198702 11/1987 United Kingdom .

Primary Examiner—Timothy V. Eley
Attorney, Agent, or Firm—Foley & Lardner, Schwartz, Jeffery, Schwaab, Mack, Blumenthal & Evans

[57] ABSTRACT

In order to simplify production line layout and revision, a plurality of unmanned self-propelled vehicles are used. Some vehicles carry a work piece from station to station while auxiliary vehicles which remain at each station carry components and assembly robots. Transport vehicle are used to move new components from storage sites to the work place. To facilitate large scale operations a camera can be used to observe the vehicles and compare the movement pattern with a predetermined desired one in order to ascertain appropriate movement.

13 Claims, 9 Drawing Sheets

0
PRODUCTION SYSTEM USING UNMANNED AUTOMATICALLY GUIDED VEHICLES

BACKGROUND OF THE INVENTION

1. Field of the Invention

The present invention relates generally to a control system for unmanned vehicles and more specifically to a system which is particularly suited for use in production plants and which enables mass production and/or the like type of assembly work to be carried out using a plurality of such vehicles.

2. Description of the Prior Art

Conventional automotive production lines and the like are arranged basically in the form of a conveyor belt type system which carries work pieces from station to station. At each station various operations such as machining, welding, assembly and the like are performed. However, with such an arrangement a large tooling investment and amount of set up time and work is required and each time the production of a different work piece is required it is necessary to revise the line. This of course usually requires at least one portion of the line be totally dismantled and rebuilt in order to meet the requirements of the new product.

When a production line which is set up for one type of automotive vehicle is changed to a different type, it is inherent that large scale revision of the assembly line must be made before production of the new vehicle can begin. For example, when a line which is set up for the production of a small sub-compact type vehicle is changed to one for a larger type having a larger engine (merely by way of example), it is necessary to at least change the section of the line wherein the chassis is formed, assembled, welded etc. Further, it is inevitable that the number and size of components and parts which must be fed from prepared stocks into the line will change.

In recent times a large number or robots are used on assembly lines to perform welding and the like tasks. In the event of a model change such as mentioned above or the like occurs, a large number of the robots must be reprogrammed (retaught) in order to perform in the desired manner.

Figure 1:
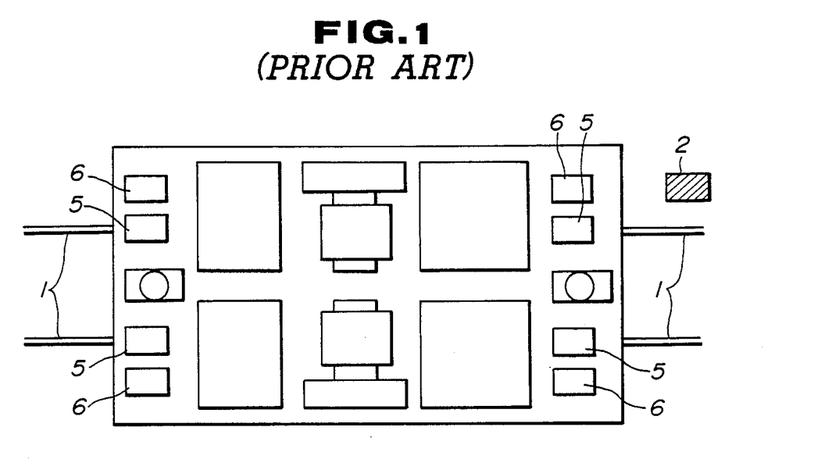
FIGS. 1 to 3 show a prior art AGV (automatic guidance vehicle) discussed in the opening paragraphs of the instant disclosure.
Figure 2:
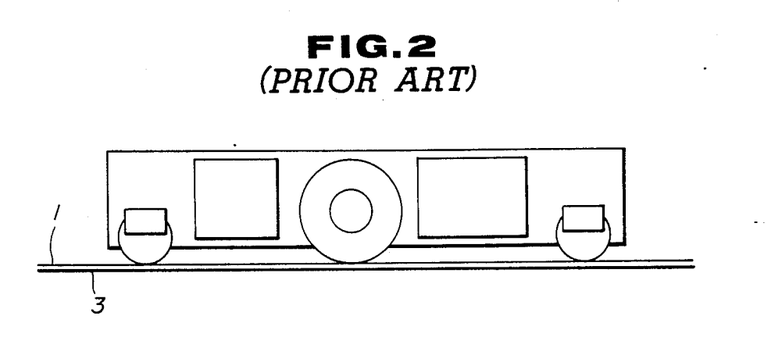

In an effort to alleviate some the above programs it has been proposed in JP-A No. 58-192111 to provide autonomous vehicles which can carry components, parts and the like through a factory or like work place. This system has, as shown in FIGS. 1 and 2, included the provision of guide lines 1 and control markers 2 on the road or floor surface 3 on which the vehicle are arranged to run. The vehicles are provided with two groups of sensors 5 and 6, one which senses the guide line and the other which senses the position of the control markers.

Figure 3:
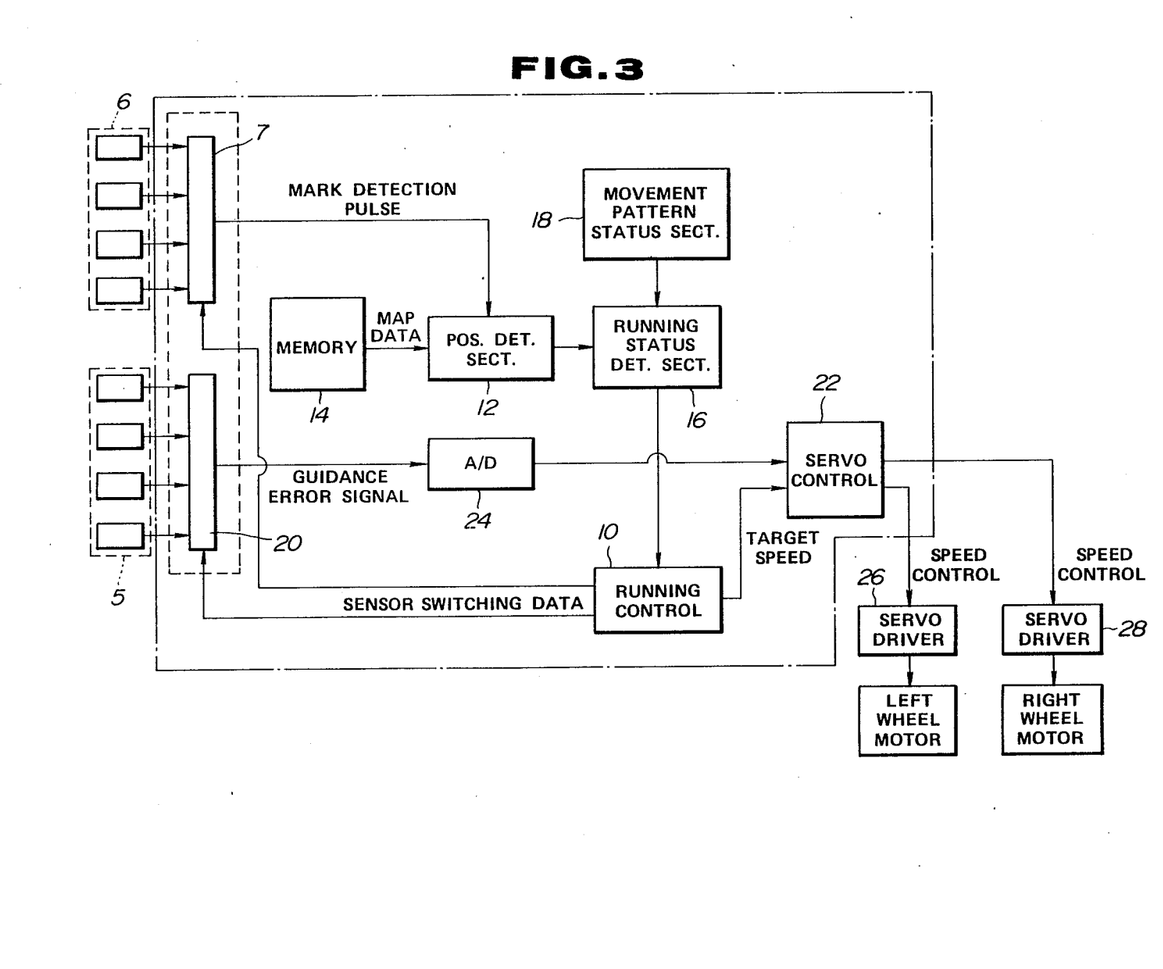

The system used in the above mentioned vehicles is arranged in the manner illustrated in FIG. 3. As will be appreciated from this drawing, the outputs of a plurality of mark detection sensors 6 (four shown by way of example) are fed to a sensor switching section 7. This section 7 is selectively controlled by a signal which is outputted by a control circuit 10 hereinafter referred to as a running control circuit) in a manner to determine which of the mark detection sensor outputs in fed to a position determination section 12. This section, as shown, is also supplied positional or map data from a memory 14. In accordance with this data input, a signal is generated and supplied to a running status determination section 16. This section 16 also receives an input from a movement pattern status section 18 and is arranged to output a control signal to the running control circuit or section 10. In response to this input the running control circuit 10 outputs two sensor switching data signals, one (as previously mentioned) to the sensor switching section 7 associated with the mark detection sensors 6 and a second one to a second sensor switching section 20 associated with a plurality (in this case 4) guide line sensors 5. This circuit 10 also outputs a target speed data signal to a servo control section 22.

The latter mentioned section 22 receives a further data input in the form of a guidance error signal from the second sensor switching section 20 via an A/D converter 24. In response to the target speed and guidance error signals the servo control section 22 outputs speed control signals to the left and right wheel motor servo drivers 26, 28.

This system while proving somewhat effective has suffered from the drawback that at least guide lines 1 and markers 2 have to be painted or otherwise provided on the floor of the factory or the like in which the above mentioned autonomous vehicles are arranged to operate. Accordingly, when it is desired to change from one production line layout to another, it is necessary to repaint the floor in a manner which covers over the old lines and establishes new ones appropriate for the new operations. This of course in the case of an automotive production line, means considerable work which must be precisely carried out in order to ensure accurate movement of the vehicles. Alternatively, it is possible to provide a number of patterns on the floor and operate the vehicles in manner to follow one of the patterns. However, this invites erroneous operations. Viz., in the case the lines or patterns become soiled or otherwise deteriorate in brightness and colour, it is likely that the autonomous vehicles will switch from following the intended pattern and follow one that is not in current use.

In the event of an erroneous sensor switching signal or sensor failure, for example, it is highly possible that the vehicle will turn left instead of right, stop when it should not, or worse still, continue when it should stop, and the like. If the batteries which power the device become low in power the vehicle is apt to stop in mid coure and block up the lanes defined by the painted lines and markers.

Moreover, the number of different patterns that can be effectively painted is limited (by effective colours widths and the like) and requires a complex arrangement of markers in order to assure the correct maneuvering of the vehicles.

Another arrangement proposed in order to permit control and movement of autonomous vehicles is disclosed in JM-A No. 61-11772. This arrangement has made use of a ultrasonic radar arrangement which is used to detect the position of a given item and provides circuits which are buried in the floor and which can be selective energized in manner which enables an autonomous vehicle to follow the electromagnetic flux which is produced.

This system however, suffers from the drawbacks of requiring the accurate (and expensive) disposition of the electric lines in the floor and the use of expensive radar units. Further, when used in a factory near welding equipment for example, the influence of noise proves to be a notable problem and can cause the vehicles to be erroneously guided away from the intended path. Accordingly, for this an other reasons, the system cannot be relied upon to provide the required stopping and starting of vehicles as is inherently required.

SUMMARY OF THE INVENTION

It is an object of the present invention to provide a system which enables production lines to be established and changed with the minimum of construction costs and trouble and which is comprised essentially of a plurality of unmanned vehicular units.

In brief, the above objects are achieved by using a plurality of unmanned self-propelled vehicles, some of which are designed to act as so called main vehicles and to carry a work piece from station to station, while other auxiliary vehicles are arranged to remain at each station and to carry components and assembly robots. Transport vehicles are used to move new components from storage sites to the work place. To facilitate large scale operations a camera can be used to observe the vehicles and compare the movement pattern with a predetermined desired one in order to ascertain appropriate movement.

More specifically, a first aspect of the present invention is deemed to comprise a system which features: a first type of unmanned self-propelled vehicle, said first type of self-propelled vehicle being arranged to carry a main work piece to a predetermined position; a second type of unmanned self-propelled vehicle, said second type of self-propelled vehicle being arranged to carry components which are to be secured to the main work piece; a control system, said control system being arranged to transmit control orders to said first and second types of self-propelled vehicle in a manner which induces said said first type of self-propelled vehicle assume said predetermined position, and said second type of self-propelled vehicle to approach and dispose said component and a predetermined site on said main work piece.

A second aspect of the present invention is deemed to comprise a system which features: a plurality of self-propelled vehicle; a camera, said camera being disposed in a location wherein a work site can be observed; a control arrangement, said control arrangement being operatively connected with said camera, said control arrangement being arranged to generate a preselected pattern which said plurality of self- propelled vehicle should assume, said control arrangement being arranged develops an image indicative of the actual positions assumed by said plurality of self-propelled vehicle and to compare the image with said pattern and determine if the desired movement of said plurality of self-propelled vehicle is being achieved or not.

A third aspect of the present invention is deemed to comprise a system which features: first and second stages; a main type of unmanned self-propelled vehicle, said main type of self-propelled vehicle being arranged to carry a main work piece to predetermined positions within each of said first and second stages, said main type of self-propelled vehicle being arranged to move sequentally from said first stage to said second stage; first and second unmanned self-propelled vehicles of an auxiliary type, each of said first and second auxiliary type of self-propelled vehicle being arranged to carry components which are to be secured to the main work piece, the first of said auxiliary type of self propelled vehicle being arranged to remain in said first stage and the second of said auxiliary type of vehicle being arranged to remain in said second stage; a control system, said control system comprising a main controller and first and second stage controllers, said main controller being arranged to transmit control signals to said main type of self-propelled vehicle in a manner which induces said said main type of self propelled vehicle to sequentially assume said predetermined positions in said first and second stages, said stage controllers being arranged to transmit orders to the first and second auxiliary type of self-propelled vehicle in a manner which induces said first and second auxiliary type of self-propelled vehicle to selectively approach and dispose a component on a predetermined site on said main work piece.

DETAILED DESCRIPTION OF THE PREFERRED EMBODIMENTS

Figure 4:
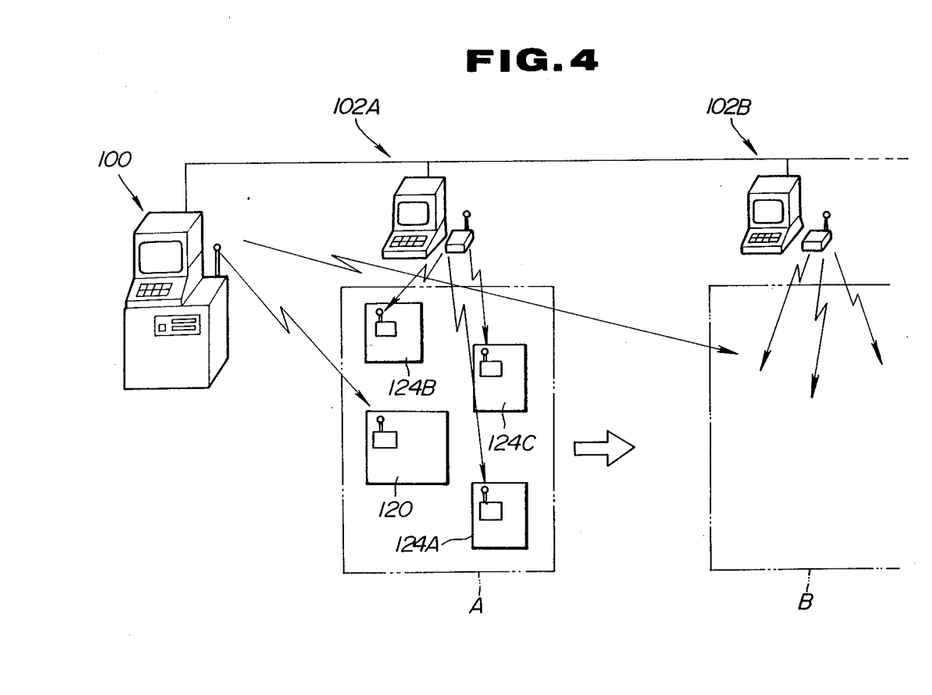
FIG. 4 schematically shows the layout according to a first embodiment of the present invention.

FIG. 4 shows an arrangement which characterizes the system according to a first embodiment of the present invention. As shown, this system includes a main control station 100 and a plurality of stage controllers 102A, 102B . . . which are operatively connected to the main control station 100. In this drawing only two stages A, B are shown for simplicity. However, as will be apparent, in the case of an automotive production line quite a large number of stages can be arranged in sequence depending on the number of operations performed at each stage. It should also be noted that the number of stages can be reduced if a relatively large number of operations are performed at each stage. Design and arrangement of production using the instant invention is extremely flexible.

By way of example only, to produce a production line, a main work station type AGV 120, on which a main work piece such as a vehicle chassis or the like 122 (FIG. 5) is supported, can be moved sequentially from stage to stage while at least one auxiliary or stage AGV 124 (in this case three 124A, 124B, 124C are shown) remain in the instant stage and perform predetermined operations on each main work station 120 as it passes from stage to stage.

Figure 5:
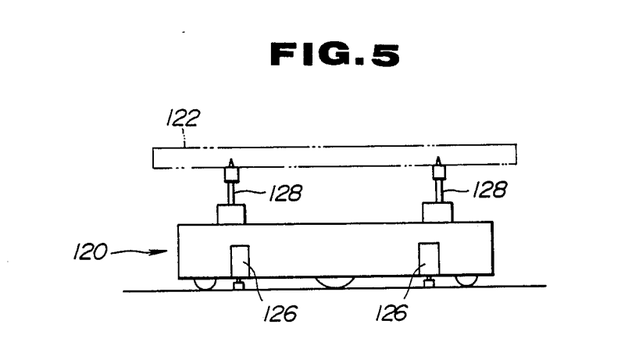
FIGS. 5 to 10 show various vehicles which can be used in connection with the embodiments of the present invention.

FIGS. 5 to 10 show various types of AGV vehicles used in each stage of the instant embodiment. FIG. 5 shows a main work station types AGV (automatic guidance vehicle) 120 on which amain work piece 122 is supported. This vehicle is provided with jacks 126 which enable the vehicle to be stably supported on the work floor once the vehicle has assumed the required position in the appropriate stage. In this instance the main work station 120 further includes work piece support jacks 128 which permit the work piece to be raised and lowered etc., in a manner which facilitates work operations. If necessary the work piece 122 can be lowered to increase stability during transmit between stages which are spaced by a relatively long distance.

Figure 6:
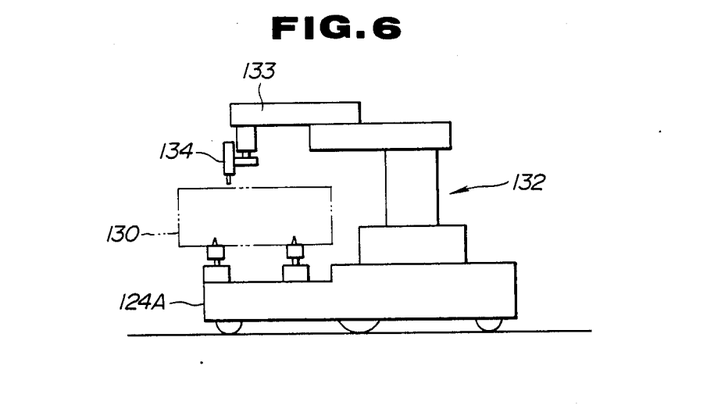

FIG. 6 shows an AGV 124A which is arranged to support a sub-work piece or component 130 which is to be attached to the main work piece 122. This work piece can be attached as is, or after a number of preliminary operations such as having bolts inserted and tightened in place by a robot 132 which is supported on the vehicle. In this instance the robot is 132 equipped with arm 133 having a nut runner 134 provided on the end thereof.

Depending on the arrangement of the various AGV and the type of product under manufacture, the nut runner 134, of course, can be swung to a position in which work unrelated to the component 130 can be done on the main work piece 120 if so desired.

Figure 7:
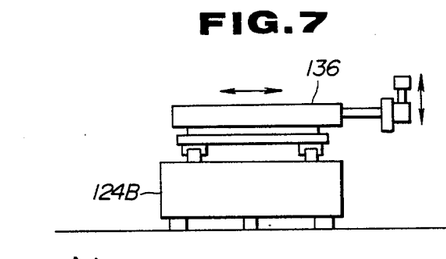
Figure 8:
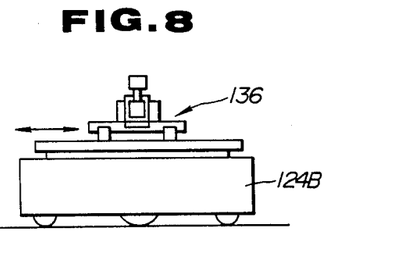

FIGS. 7 and 8 show front and side elevational views of an AGV 124B which is provided with only a tool such as a nut runner equipped robot device 136. Any suitable tool or tools can be selectively mounted. In this instance the tool can be moved about in the illustrated manner. This AGV can be moved to and about the main AGV 120 in a manner which enables various operations to be performed on the main work piece 122.

Figure 9:
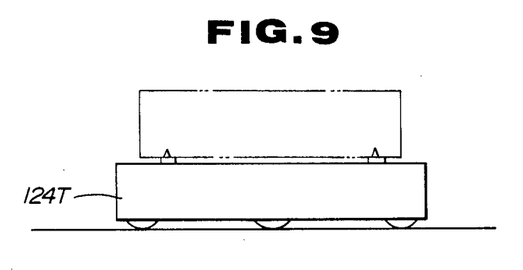
Figure 10:
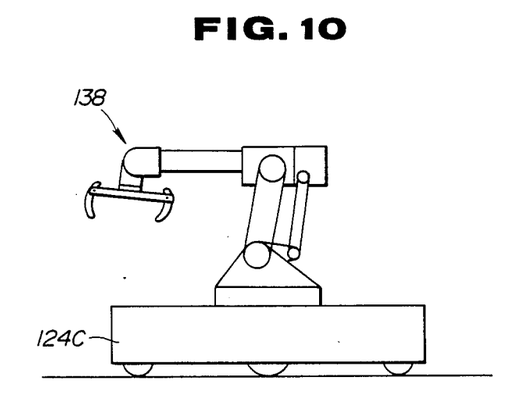

FIG. 9 shows an AGV 123T which is adapted to only transport various components (no numeral) from storage sites to the work site; while FIG. 10 shows an AGV 124C which is equipped with a crane 138 (mechanical hand) which is adapted to lift components from the transport AGV 124T and place them either on one of the auxiliary AGVs or onto the main work piece 120 as the situation demands.

Depending on the product which is being produced, the number of and type of auxiliary AGVs which are used in each stage will, of course, vary.

The operation of the above type of arrangement is controlled via a program which is run in the main controller 100. This system is such that the main controller 100 issues control signals to the main work station AGVs and to the stage controllers which in turn issue signals to the various auxiliary AGV assigned to the various stages.

Figure 11:
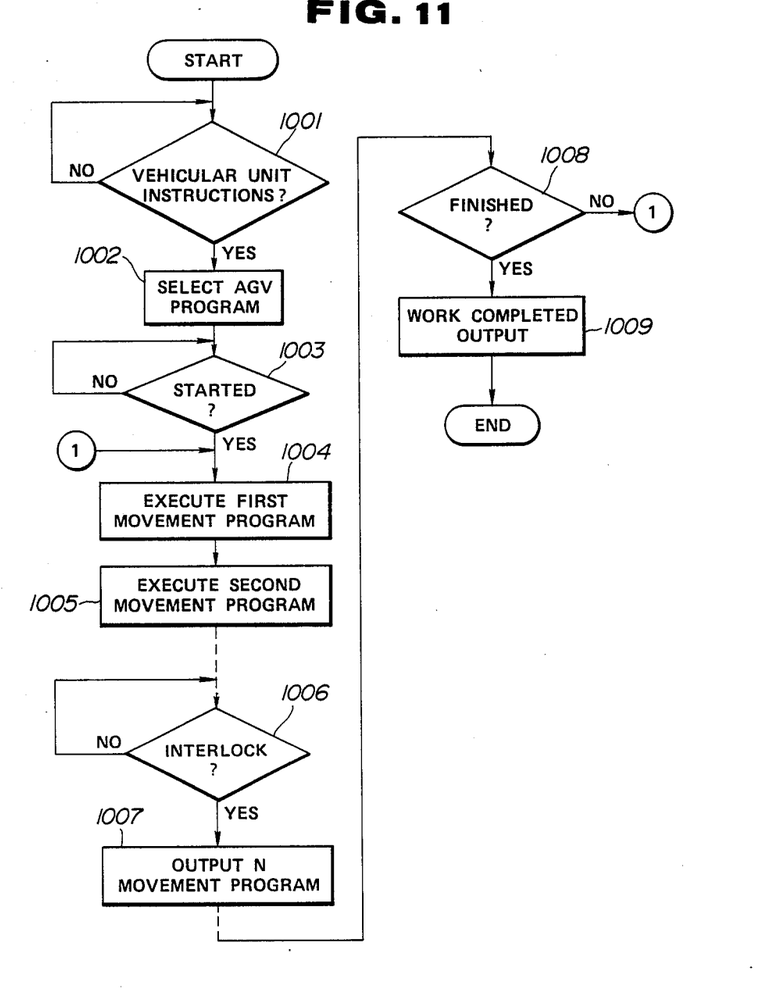
FIG. 11 is a flow chart depicting the steps which characterize the operation of the first embodiment of the present invention.

The characteristic operations which are performed by the main controller are depicted in flow chart form in FIG. 11.

As will be appreciated following the start of the program it is determined in step 1001 whether vehicular unit instructions which are necessary for selectively moving the various AGVs have been issued or not. In the case of a positive outcome the program flows to step 1002 wherein the appropriate AGV program or programs which are to be run by the stage controller are selected. It should be noted that the main controller is arranged to issue a control signal which induces the main AGV to move in the direction indicated by the bold arrow to a predetermined position in the first stage (for example) of the process. Following this, signals are issued to the stage controllers 102A, 102B etc., which contain data relating to the required movement and operations to be performed by the auxiliary or stage AGV.

At step 1003 an enquiry is performed to determine if the process has started or not. In the event that the process has not yet been initiated, the program recycles.

Figure 12:
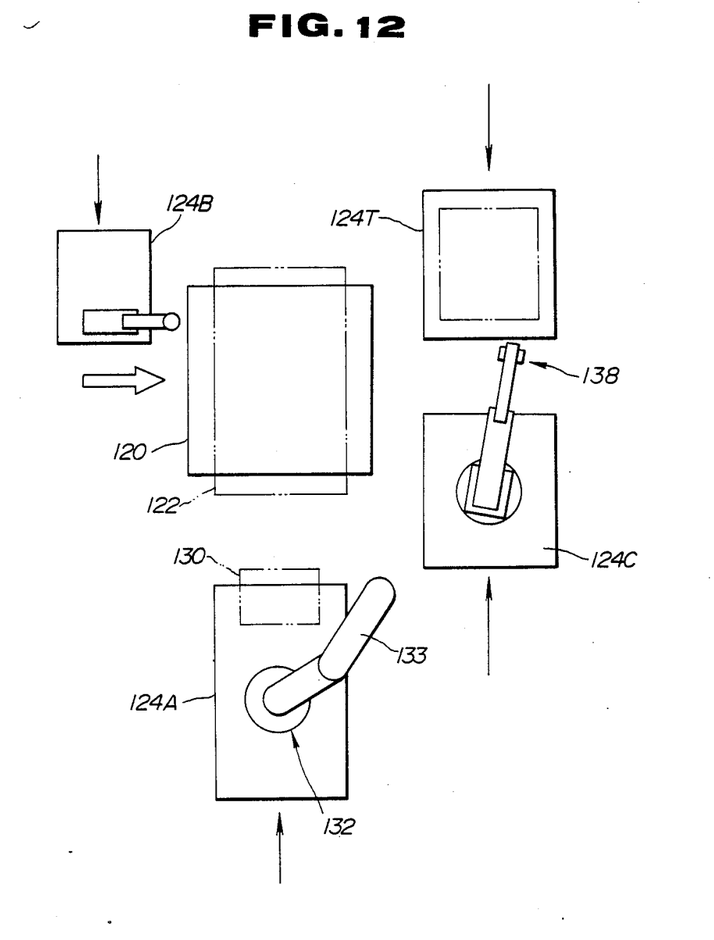
FIG. 12 is a plan view showing an example of vehicular movement which can be achieved with the first embodiment of the present invention.

At step 1004, following the initiation of movement, a first movement program is run. This first program is designed (merely by way of example) to induce AGV 124A to move the component 130, supported thereon, into position wherein a nut runner can secure it to the main work piece 122. A step 1005, a second movement program is run. This program is, as shown in FIG. 12, designed to move the transport AGV 124T into proximity of the one on which the main work piece 122 is supported on, and to then move the crane equipped AGV 124C into position wherein the hand 138 can grasp the component which is supported on the transport vehicle 124T and place it in position on the main work piece 122.

It will be noted that the provision of positions sensors of the nature disclosed in copending U.S. patent application Ser. No. 183,982 filed on Apr. 20, 1988 in the name of Yokoi et al can be provided on the appropriate AGV in a manner which faciliates the movement of the same and the elevation of the component to be position on and secured to the main work piece.

The above mentioned application discloses the use of two cameras which are arranged back to back and which can be disposed between the main work piece and the component to be mounted thereon, and used to develop images of the holes (for example) or sites which should be aligned in order to permit proper connection. The height and lateral position of the component is then adjusted until the two images exactly overlap one and other, the camera is withdrawn and the component moved into position on the main work piece. In the instant arrangement, the height of the component is adjusted using the jacks while the lateral position be carried out either by moving the AGV itself or by providing a laterally action position control servo of a suitable type.

It should be noted that, for the sake of explanation only, the instant embodiment is such that the main work piece is to have only two components secured thereto in the first stage. In the case of an automotive vehicle it is possible to use a number of transports AGV, and several crane AGV in a manner to bring and attached a considerable number of components to the vehicle in the first stage alone.

Merely by way of example, it is further possible to provide sensors on each of the AGV which enable the vehicles to automatically distinguish one from the other and to align themselves in a manner which faciliates the appropriate approach and orientation with the main AGV on which the main work piece is supported. In addition and/or as an alternative to this, it is also possible to arrange the stage controllers (and or the AGV) to emit a guidance signal or signals which enables either the vehicles to determine their position and distance from the state controller, or the stage controller to determine the distance and location of each of the vehicles from a given controller.

At step 1006 in the flow chart shown in FIG. 11 the presence or absence of an interlock signal is determined. While this signal is absent the program recycles and awaits the completion of the instant positioning and locating task or tasks.

When the interlock signal appears, the program flows to step 1007 wherein a so called N movement program is run. This program is designed to induce the nut runner equipped AGV to move in and to insert and tighten the nuts and bolts (for example) which secure the correctly located components in position.

Step 1008 monitors the operation of the N program and awaits the completion thereof. Following step 1008 a signal is issued to the main controller 100 indicating that the work in this stage is completed and that an instruction to move the main AGV to the next station can be issued.

In the case that a number of main AGV are in the line, the main controller awaits the completion of all tasks before issuing a signal which will induce the train of main AGV to each move to the next stage.

Figure 13:
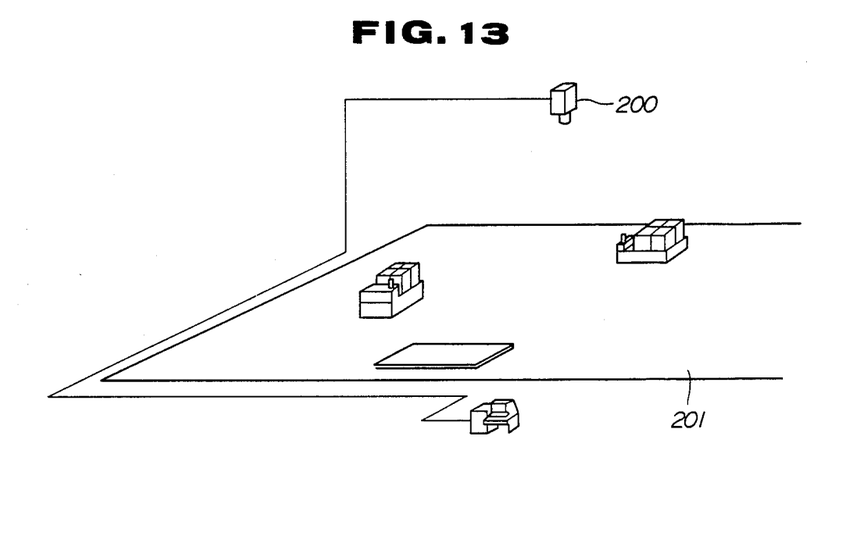
FIG. 13 is an perspective sketch showing an arrangement which typifies a second embodiment of the present invention.
Figure 14:
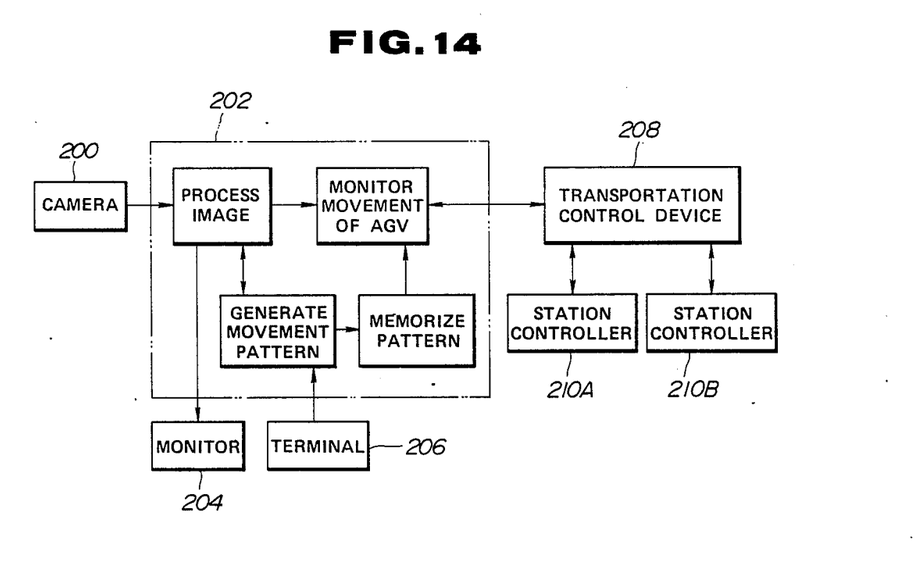
FIG. 14 is a block diagram which depicts the arrangement and operation of the second embodiment.
Figure 15:
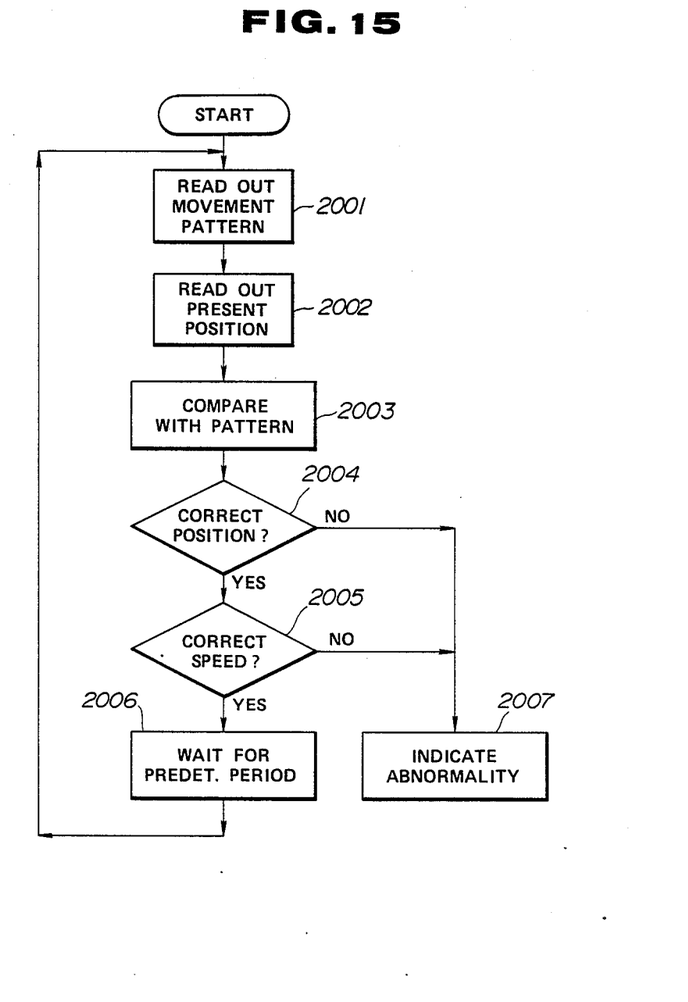
FIG. 15 is a flow chart showing the steps which characterize the operation of the second embodiment of the present invention.

FIGS. 13 to 15 show a second embodiment of the present invention. In this arrangement a camera 200 is mounted above the floor 201 of the work place in a position wherein the positions of the various AGV can be observed. In this arrangement the camera 200 is used to produce an image of the work floor in a manner which enables the movement of the AGVs to be monitored. In FIG. 13 only two AGVs are shown for simplicity of illustration and explanation. However, as will be appreciated this system is capable of being applied to a complex arrangement comprised of a large number of AGV which are arranged to define a production line for example.

The operation of the above type of system is such that the camera 200 is operatively connected to a monitoring/control unit 202 wherein an image of the floor is developed. This image is transmitted to a monitor (display) 204 which which an operator can observer the situation. The system further includes a suitable interface or terminal 206 via which data can be inputted. As schematically shown, the data input is used to generate a movement pattern. This pattern is memorized and compared with the actual image produced.

As will be appreciated using suitable software it is possible to produce a digital image (for example) of the nature which can be superimposed with a similarly digitized image of the actual floor, and the comparison used to indicate if the movement of the various elements is going according to a predetermined schedule or not. In accordance with the outcome of this monitoring appropriate signals are fed to and received from a transport control device 208. This device is arranged to output and receive signals from a plurality of station controllers 210A, 210B (only two are shown in FIG. 14).

FIG. 15 shows in flow chart form the steps which characterize the operation of the second embodiment. As will be appreciated following the start of the program the movement pattern which is required is read out of memory and installed ready for use. At step 2002 the input from the camera 200 is analysed in a manner which enables the position of each of the AGV to be determined and this data is read out. In step 2003 the two sets of positional data are compared and and in step 2004 a decision made as to whether the instant actual position are correct or not. At step 2005 the rate at which the AGV are actually moving are compared with the values which should be occuring at this point of the process. In the event that either of steps 2004 and 2005 indicate an improper position or speed the program flow to step 2007 wherein an abnormality is indicated and the attention of an operator called to the fact that correction is required.

On the other hand, in the event that both of the speed and positions of the AGV are correct then at step 2006 a "wait" for a predetermined period command is issued. Following this, step the program recycles to step 2001 and the program repeats.

As will be appreciated, as the time at which the program repeats is essentially constant, the distance each AGV has moved per run can be taken as the speed thereof.

It is to be understood that the concept of the invention is not limited to the above described two techniques and a combination of the two is clearly within the realm of possibility. The use of the camera equipped embodiment is deemed to be suited to the control of the transport AGV which may have to travel some distance to a storage site where they can be loaded with a predetermined component or components required at one of the stages mentioned in connection with the first embodiment.

It is within the scope of the invention to use laser beams and the like which can be beamed through the work site and used in combination with suitable photo responsive sensors etc., for guiding and/or alignment of the AGV. Of course laser beams and the like can be used to transmit the control signals between the controllers and the AGV if so desired,

What is claimed is:

1. An automated delivery and assembly system, comprising:
   a first unmanned self-propelled vehicle, said first vehicle being arranged to carry a main work piece;
   a second unmanned self-propelled vehicle, said second vehicle being arranged to carry components which are to be secured to the main work piece;
   transfer means for moving said components from said second vehicle to the main work piece on said first vehicle;
   a control system being arranged to transmit control orders by way of a wireless communication system to said first and second vehicles and said transfer means, said control orders containing data which induces said first vehicle to assume a predetermined position on a work floor, and to induce said second vehicle to move along the work floor, approach said first vehicle and induce said transfer means to place said component on a predetermined site on said main work piece while said main work piece is on said first vehicle.

2. A system as claimed in claim 1 further comprising a self-propelled vehicle, being arranged to support a robot which performs a predetermined operation on said component when said component is disposed on said predetermined site.

3. A system as claimed in claim 2 further comprising a fourth self-propelled vehicle, being arranged to carry a robot which is equipped with a crane, said crane being arranged to lift and place a component in position on said main work piece.

4. A system as claimed in claim 3 further comprising a fifth self-propelled vehicle, being arranged to carry components from a storage site to said predetermined position, said fifth self-propelled vehicle being arranged to cooperate with said fourth self-propelled vehicle in a manner wherein the component which is carried on said fifth self-propelled vehicle is taken therefrom and placed on said main work piece.

5. A system as claimed in claim 1 wherein said control system comprises a camera, said camera being positioned above the work floor on which said first and second vehicles are arranged to run and from which said first and second vehicles can be observed, said camera developing an image which depicts the positions of said first and second vehicles on the work floor, said camera being supported by a structure separate from said first and second vehicles.

6. An automated delivery and assembly system, comprising:
a plurality of self-propelled vehicles, said plurality of vehicles being arranged to run on a work floor;
a camera positioned in a location above the work floor, wherein a work site can be observed, said camera being supported by a structure separate from said plurality of vehicles;
a control device, said control device being operatively connected with said camera, said control device being arranged to generate a preselected pattern, said pattern depicted the arrangement which said plurality of selfpropelled vehicles should assume on the work floor, said control device being arranged to use the image data from said camera to develop an image indicative of the actual positions assumed by said plurality of selfpropelled vehicles on the work floor, compare the image with said pattern and determine if the desired movements of said plurality of self-propelled vehicles are being achieved.

7. A system as claimed in claim 6 wherein said plurality of self-propelled vehicles include:
a first type of unmanned self-propelled vehicle, said first type of self-propelled vehicle being arranged to carry a main work piece to a predetermined position; and
a second type of unmanned self-propelled vehicle, said second type of self-propelled vehicle being arranged to carry components which are to be secured to the main work piece.

8. A system as claimed in claim 7 further comprising a third type of self-propelled vehicle, said third type of self-propelled vehicle being arranged to support a robot which performs a predetermined operation on said component when said component is disposed on said predetermined site.

9. A system as claimed in claim 8 further comprising a fourth type of self-propelled vehicle, said fourth type of self-propelled vehicle being arranged to carry a robot which is equipped with a crane, said crane being arranged to lift and place a component in position on said main work piece.

10. A system as claimed in claim 9 further comprising a fifth type of self-propelled vehicle, said fifth type of self-propelled vehicle being arranged to carry components from a storage site to said predetermined position, said fifth type of self-propelled vehicle being arranged to cooperate with said fourth type of self-propelled vehicle in a manner wherein the component which is carried on said fifth type of self propelled vehicle is taken therefrom and placed on said main work piece.

11. In automated delivery and assembly system, comprising:
means defining first and second stages;
a main type of unmanned self-propelled vehicle, said main type of self-propelled vehicle being arranged to carry a main work piece to predetermined positions within each of said first and second stages, said main type of self-propelled vehicle being arranged to move sequentially from said first stage to said second stage;
first and second unmanned self-propelled vehicles of an auxiliary type, each of said first and second auxiliary types of self-propelled vehicles being arranged to carry components which are to be secured to the main work piece, the first of said auxiliary type of self propelled vehicle being arranged to remain in said first stage and the second of said auxiliary type of vehicle being arranged to remain in said second stage;
a control system comprising a main controller and first and second stage controllers, said main controller being arranged to transmit control signals to said main type of selfpropelled vehicle in a manner which induces said main type of self propelled vehicle to sequentially assume said predetermined positions in said first and second stages, said stage controllers being arranged to transmit orders to the first and second auxiliary type of selfpropelled vehicle in a manner which induces said first and second auxiliary type of self-propelled vehicle to selectively approach and place a component on a predetermined site on said main work piece.

12. An automated delivery and assembly system, comprising:
a first unmanned vehicle, said first vehicle being arranged to support a work piece and carry the same through a plurality of work stages which are arranged on a work floor;
a plurality of second unmanned vehicles in each of said stages, said second vehicles being arranged to carry components to be connected to the work piece;
a plurality of third unmanned vehicles in each of said stages, said third vehicles supporting first robots which transport the components from said second vehicles to the work piece on said first vehicle;
a plurality of fourth unmanned vehicles in each of said stages, said fourth vehicles supporting second robots which connect the components to said work piece; and
control means for transmitting data by way of a wireless communication network between said first, second, third and fourth vehicles, said control means including a main control station and a plurality of stage controllers, each of said stage controllers being assigned to one of said plurality of work stages.

13. A system as claimed in claim 12, further comprising a camera, said camera being disposed in a position above the work floor and in which the positions of said first, second, third and fourth vehicles on said work floor can be observed and an image which depicts the positions of the same to be developed; said control means comparing the image with a predetermined pattern to determine if the first, second, third and fourth vehicles are in required positions.

* * * * *